(12) United States Patent
Ellnor

(10) Patent No.: US 7,735,775 B2
(45) Date of Patent: Jun. 15, 2010

(54) WING-IN-GROUND-EFFECT CRAFT

(76) Inventor: Piet Ellnor, 5 Coolgardie Avenue, East Fremantle (AU) 6160

( * ) Notice: Subject to any disclaimer, the term of this patent is extended or adjusted under 35 U.S.C. 154(b) by 611 days.

(21) Appl. No.: 10/587,680

(22) PCT Filed: Jan. 27, 2005

(86) PCT No.: PCT/AU2005/000094

§ 371 (c)(1),
(2), (4) Date: Jun. 1, 2007

(87) PCT Pub. No.: WO2005/073046

PCT Pub. Date: Aug. 11, 2005

(65) Prior Publication Data

US 2007/0272795 A1    Nov. 29, 2007

(30) Foreign Application Priority Data

Jan. 30, 2004 (AU) ............................... 2004900404

(51) Int. Cl.
*B64C 5/04* (2006.01)

(52) U.S. Cl. .................. 244/45 A; 244/45 R; 244/4 R; 114/272

(58) Field of Classification Search .................. 244/4 R, 244/12.1, 13, 15, 23 R, 34 R, 35 R, 208, 244/45 R, 47, 45 A, 50, 101, 105, 106, 2, 244/55; 114/271, 272, 273, 283, 261, 262; 180/116, 117

See application file for complete search history.

(56) References Cited

U.S. PATENT DOCUMENTS

| 3,614,033 | A | * | 10/1971 | McCarty, Jr. | ................... 244/48 |
| 3,954,231 | A | * | 5/1976 | Fraser | .......................... 244/225 |
| 4,080,922 | A | * | 3/1978 | Brubaker | ..................... 114/282 |
| 6,014,940 | A | * | 1/2000 | Jacobson | ..................... 114/271 |
| 2003/0173455 | A1 | | 9/2003 | Herpay | |

FOREIGN PATENT DOCUMENTS

| DE | 3804561 A | 8/1989 |
| RU | 2224671 C1 | 2/2004 |

* cited by examiner

Primary Examiner—Michael R Mansen
Assistant Examiner—Joshua J Michener
(74) Attorney, Agent, or Firm—Fredrikson & Byron, P.A.

(57) ABSTRACT

A wing-in-ground-effect craft (11) having a loaded canard forewing (13) and a main forward delta configuration wing (15) attached to fore (17) and mid (19) sections of a body (21) respectively. The body (21) is formed with an integral planing hull (23) for amphibious applications, extending rearward to a tail section (25) which incorporates a ducted fan (27), and a vertical stabilizer (29). Rudder (31) is located in the exhaust of the ducted fan (27) for steering the craft (11), and serves as a stator to reduce spiral induced in the airflow exiting the duct (27). The canard forewing (13) has about 12% of the area of the main wing (15), and has inner portions (35) having a dihedral configuration disposed at a first angle of inclination from the vertical of 68°, and outer portion (37) disposed at a first angle of inclination from the vertical of about 91°.

18 Claims, 5 Drawing Sheets

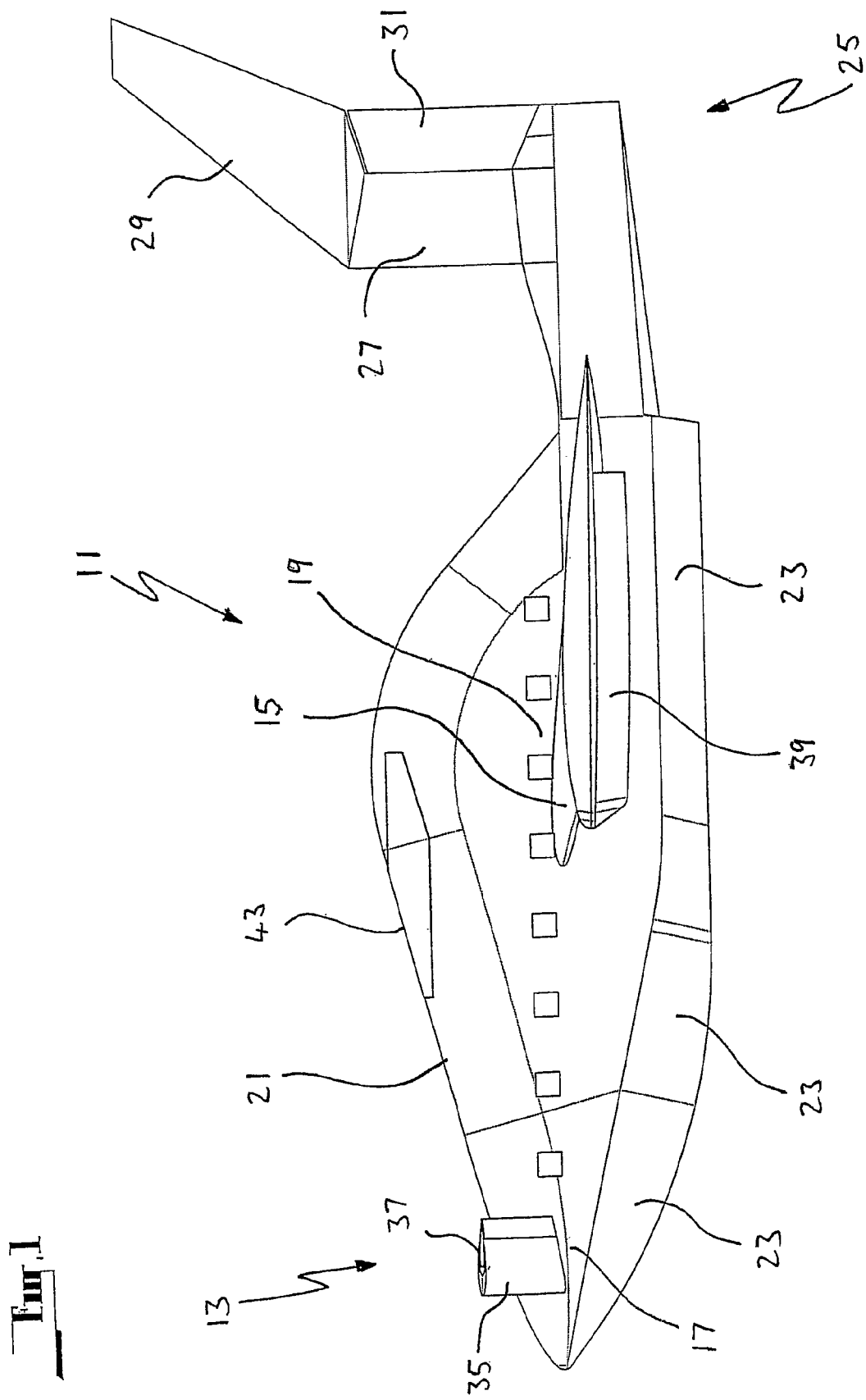

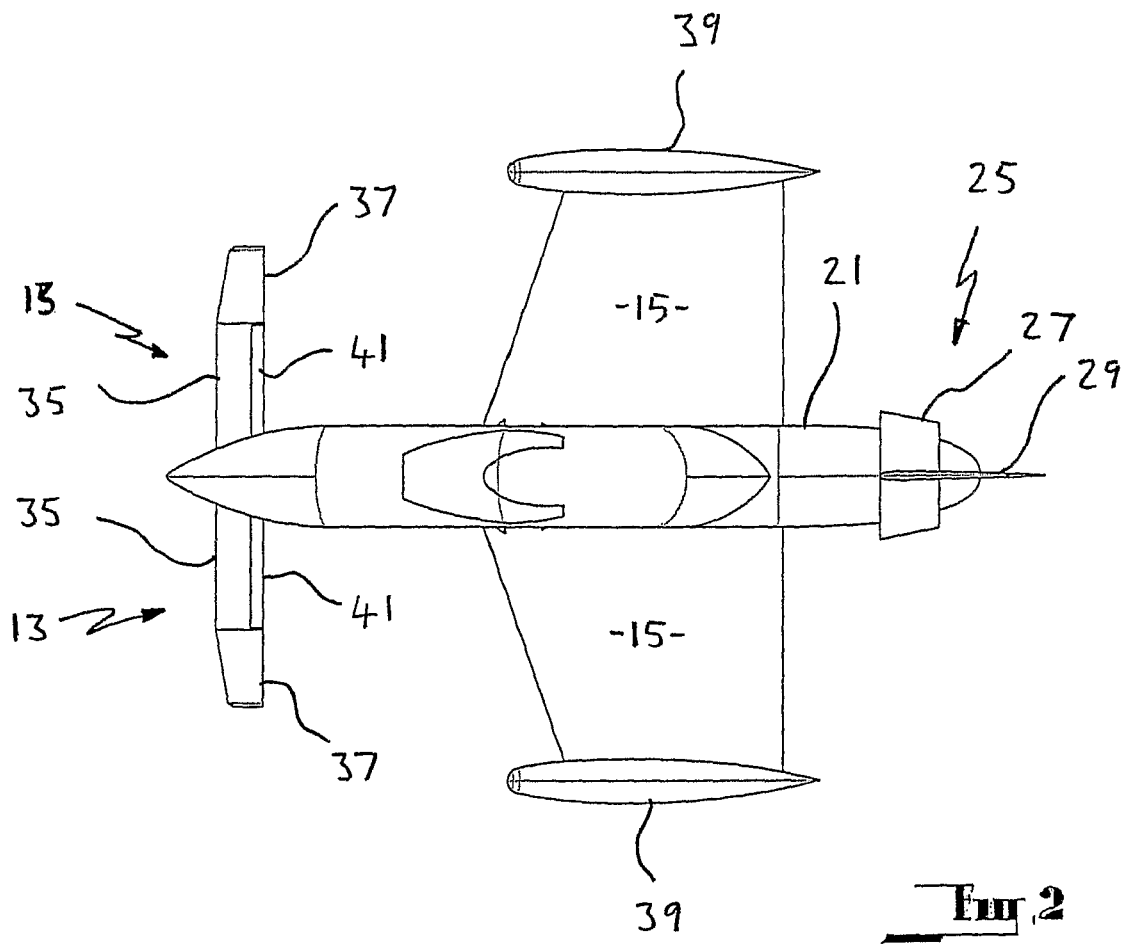
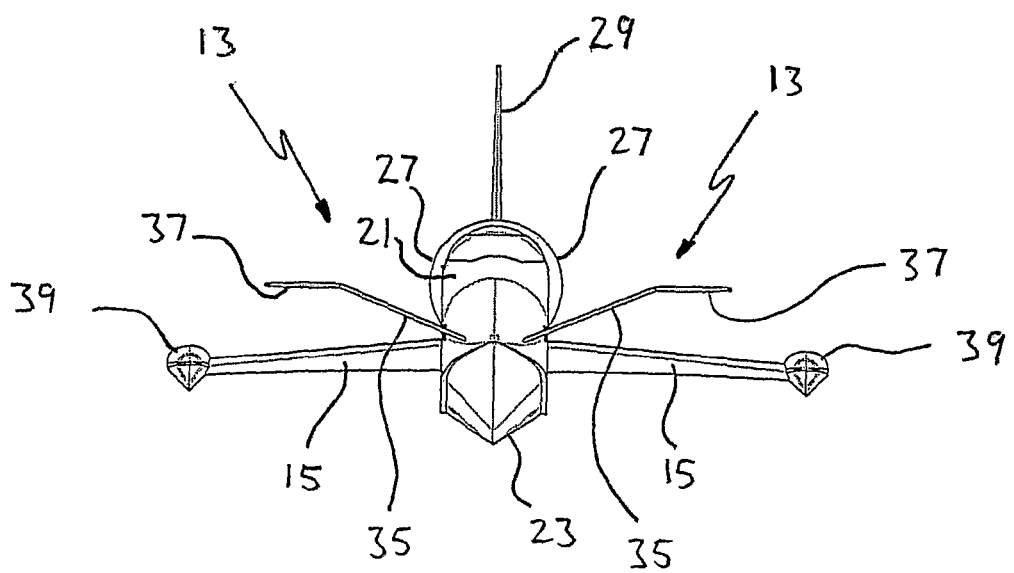

WING-IN-GROUND-EFFECT CRAFT

RELATED APPLICATIONS

This application claims priority to International Application No. PCT/AU2005/000094 filed Jan. 27, 2005 and to Australian Application No. 2004900404 filed Jan. 30, 2004, the teachings of both of which are incorporated herein by reference.

FIELD OF THE INVENTION

This invention relates to aircraft and in particular to wing-in-ground-effect craft, although not limited to ground effect craft. Particularly, this invention relates to water borne wing-in-ground-effect craft.

BACKGROUND ART

Maritime logistic and supply support relies on the use of marine (water borne) vessels, helicopters and in some cases light aircraft for transportation of materials and personnel to and from offshore facilities and locations.

Typically bulk and heavy material is transported using supply boats, self propelled barges and the like, personnel may be carried on fast crew boats, ferries, helicopters or light aircraft dependent on the facility location, availability of a suitable airstrip and distance from the point of embarkation.

Research suggests that a niche exists in the maritime personnel and light materials transportation environment for distances between 50 and 1,000 miles. Below 50 miles fast surface vessels dominate and beyond 1,000 miles aircraft are the preferred solution. A potential opportunity exists to penetrate this market in the area of fast or "hot shot" logistical response using wing-in-ground-effect technology. However, to date, wing-in-ground-effect technology has gained barely limited acceptance, and at best can only be regarded as being in its infancy.

The wing-in-ground-effect craft, which is alternatively known as a wing-in-surface-effect craft, was first successfully developed in the early 1960's in the former USSR where it was known as "ekranoplan". Subsequent developments in other parts of the world have experimented with varying degrees of success, with different configurations. Russian development work culminated in the 1970's with the development of large waterborne ground-effect craft capable of the rapid deployment of masses of military equipment and personnel in and around the Caspian Sea.

For longitudinal stability nearly all known wing-in-ground-effect craft have relied on a relatively large horizontal tail plane, when compared with aircraft. This horizontal tail plane is nearly one third the size of the main wing in many craft, and sometimes larger. Another design originating in Russia used two equal sized wings in tandem, and in-line, effectively the rearward wing replacing the horizontal tail plane.

It is an object of this invention to provide a wing-in-ground-effect craft having a differing configuration from those hitherto described and used.

Throughout the specification, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with one aspect of the invention there is provided a wing-in-ground-effect craft characterised by canard configuration, having a canard forewing and a main wing.

Preferably the canard forewing has less than 50% of the area of the main wing.

Preferably the canard forewing has less than 40% of the area of the main wing.

Preferably the canard forewing has less than 30% of the area of the main wing.

Preferably the canard forewing has from 10% to 20% of the area of the main wing.

Preferably the canard forewing has from 10% to 15% of the area of the main wing.

Preferably the canard forewing has from 11% to 13% of the area of the main wing.

Preferably the canard forewing has a substantial portion with a dihedral configuration disposed at a first angle of inclination from the vertical.

The area comparisons of the canard forewing and main wing referred to above are as viewed in horizontal projection. With a dihedral canard forewing, the actual area of the forewing is greater than the area as viewed in horizontal projection. By horizontal projection, it is meant as viewed directly from above (or below).

Alternatively the canard forewing has a dihedral configuration in its inner portion, said inner portion being disposed at a first angle of inclination from the vertical, said canard forewing having its outer portions disposed at a second angle of inclination from the vertical which is greater in absolute terms than said first angle.

Preferably said first angle lies from 80° to 65°.
Preferably said first angle lies from 75° to 65°.
Preferably said first angle lies from 70° to 66°.

The most preferred first angle is 68°. This equates to the inner portion having a dihedral angle of 22°.

Preferably said second angle is from 85° to 95°. The most preferred second angle is from 90° to 92°, which equates to a flat to slightly anhedral configuration in the outer portions.

Preferably said dihedral configuration or said inner portions have an angle of attack of from 5° to 9°.

Preferably said dihedral configuration or said inner portions have an angle of attack of from 6° to 8°.

Preferably said dihedral configuration or said inner portions have an angle of attack of from 7° to 7.5°.

Preferably said outer portions have an angle of attack less than the angle of attack of the inner portions.

Preferably said outer portions have an angle of attack of from 2° to 6°.

Preferably said outer portions have an angle of attack of from 3° to 5°.

Preferably said outer portions have an angle of attack of from 4° to 4.5°.

Preferably said canard forewing incorporates control surfaces, which are preferably located on the inner portions thereof.

Preferably said control surfaces comprise elevons. The elevons provide the function of ailerons and elevators.

Preferably said elevons are located one on each said inner portion.

Preferably said main wing is of forward delta configuration.

Preferably said main wing is flat (ie neither dihedral or anhedral) in configuration.

Alternatively said main wing may be slightly anhedral in configuration.

Preferably the anhedral angle of said main wing lies from 5° to 15° measured from the lift (upper) surfaces, and from 1° to 6° measured from the lower surfaces.

Preferably said main wing has an angle of attack of from 2° to 6°.

Preferably said main wing has an angle of attack of from 3° to 5°.

Preferably said main wing has an angle of attack of from 4° to 4.5°.

Preferably said wing-in-ground-effect craft is amphibious, and has a planing hull.

Preferably said main wing incorporates pontoon floats attached to opposite outer extremities thereof (ie one pontoon on each side of the craft). In operation, the pontoons act as end-fences.

Preferably said wing-in-ground-effect craft has a single vertical stabilizer located at the rear thereof.

Preferably said vertical stabilizer is located atop a first propulsion unit in the form of a ducted fan. In other arrangements of the wing-in-ground-effect craft, where power requirements dictate use of more than one ducted fan for propulsion, other configurations may be adopted.

Preferably said wing-in-ground-effect craft includes at least one rudder control surface located in the flow pathway of said ducted fan. Steering of the wing-in-ground-effect craft is effected by movement of the rudder control surface while the ducted fan is in operation.

Preferably said wing-in-ground-effect craft incorporates a spade rudder for low speed control, said spade rudder being disposed so as to be immersed below the water-line when the hull is afloat.

Preferably said wing-in-ground-effect craft includes a further propulsion unit in the form of a water propulsion means extending below said hull, preferably in the form of a retractable leg. The retractable leg could include either an outboard drive or a jet drive as the further propulsion unit. The further propulsion unit can be used to assist in overcoming the hump drag of the hull, allowing the craft to more easily achieve ground-effect flight.

BRIEF DESCRIPTION OF THE DRAWINGS

Two preferred embodiments of the invention will now be described in the following description made with reference to the drawings, in which:

FIG. 1 is a side elevation of a wing-in-ground-effect craft according to either embodiment;

FIG. 2 is a plan elevation of the wing-in-ground-effect craft;

FIG. 3 is a front elevation of the wing-in-ground-effect craft;

BEST MODE(S) FOR CARRYING OUT THE INVENTION

Figure 4:
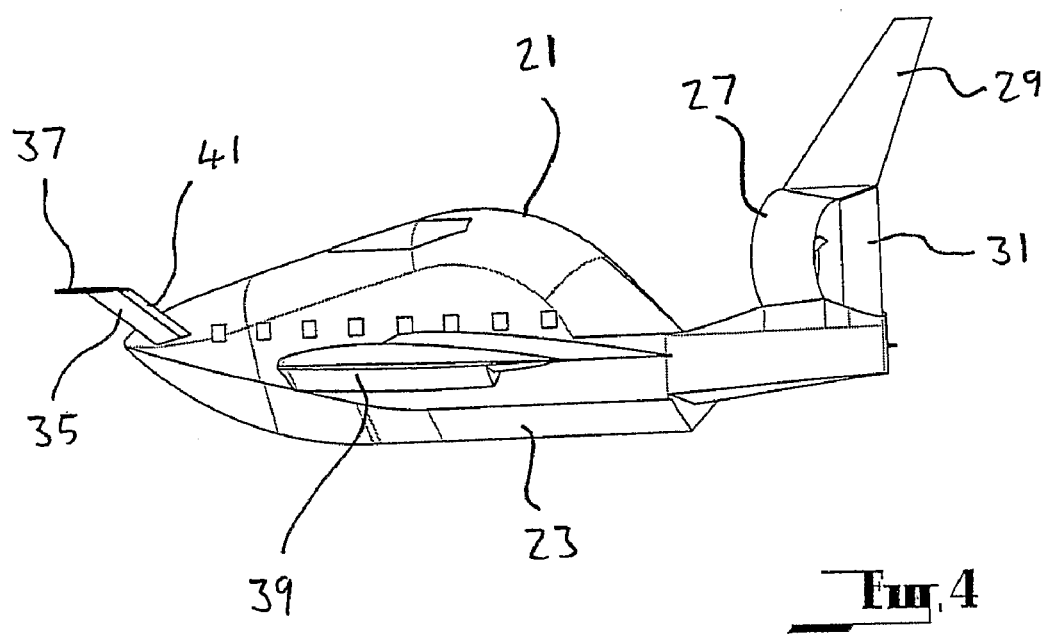
FIG. 4 is a side elevation rotated aft, of the wing-in-ground-effect craft.
Figure 5:
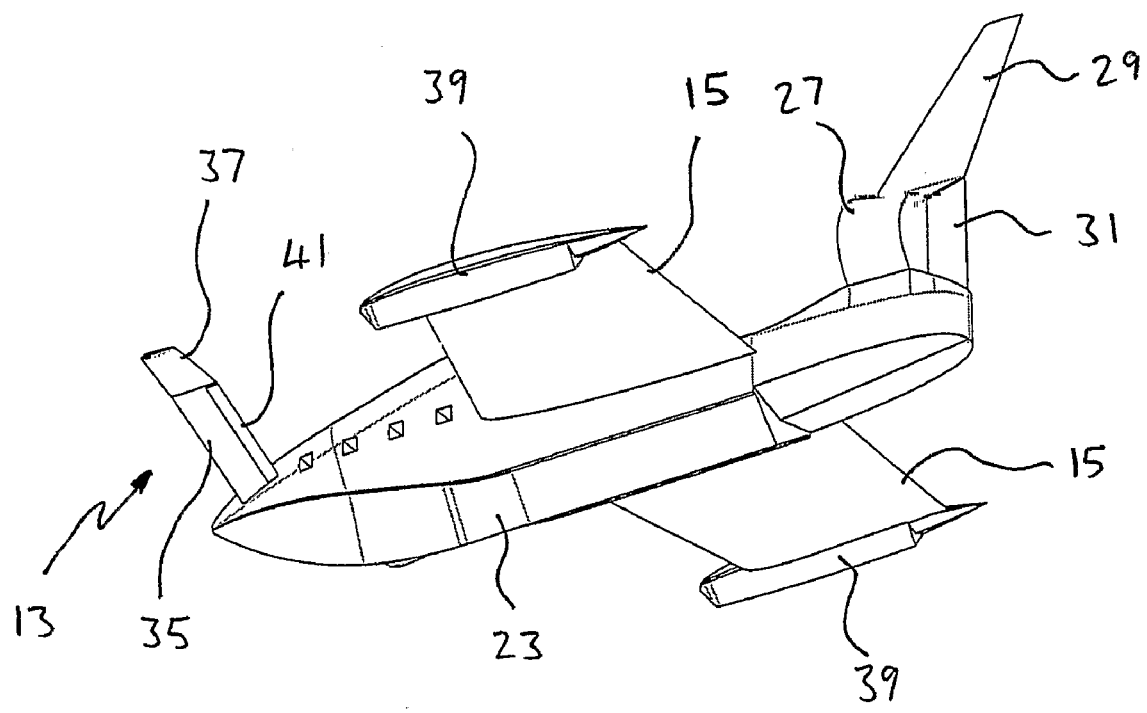
FIG. 5 is an elevation from below and behind, of the wing-in-ground-effect craft.
Figure 6:
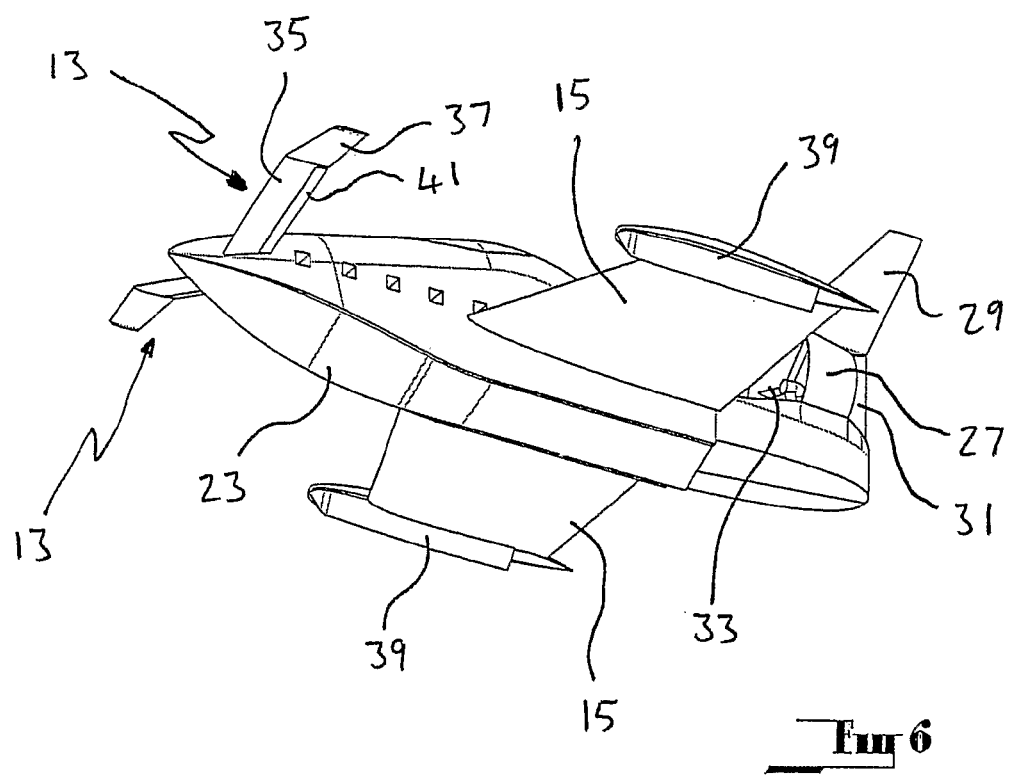
FIG. 6 is an elevation from below and in front, of the wing-in-ground-effect craft.
Figure 7:
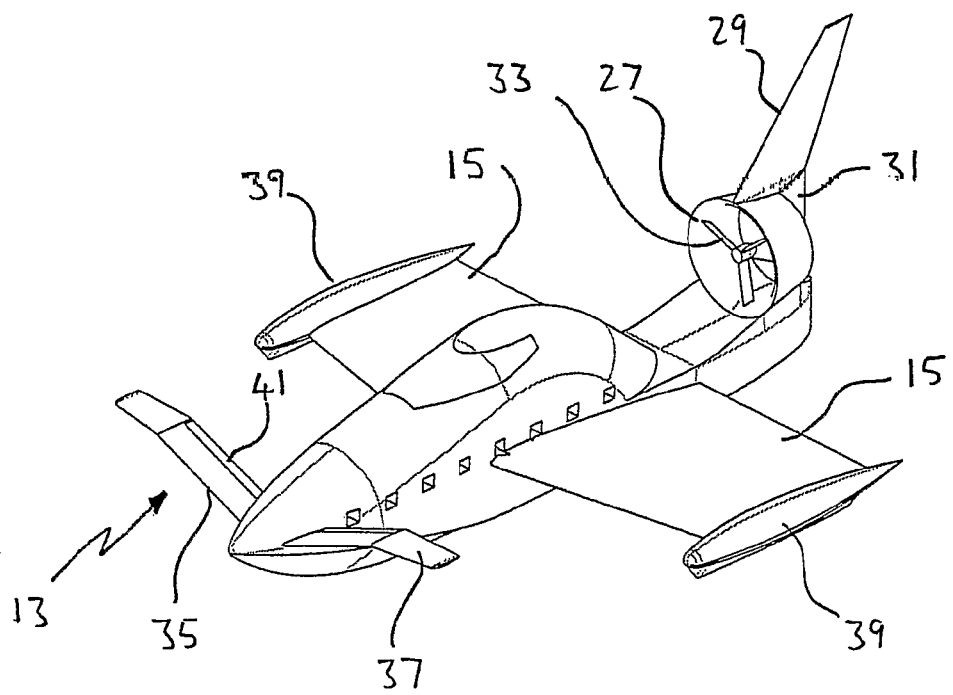
FIG. 7 is an elevation from above and in front, of the wing-in-ground-effect craft.
Figure 8:
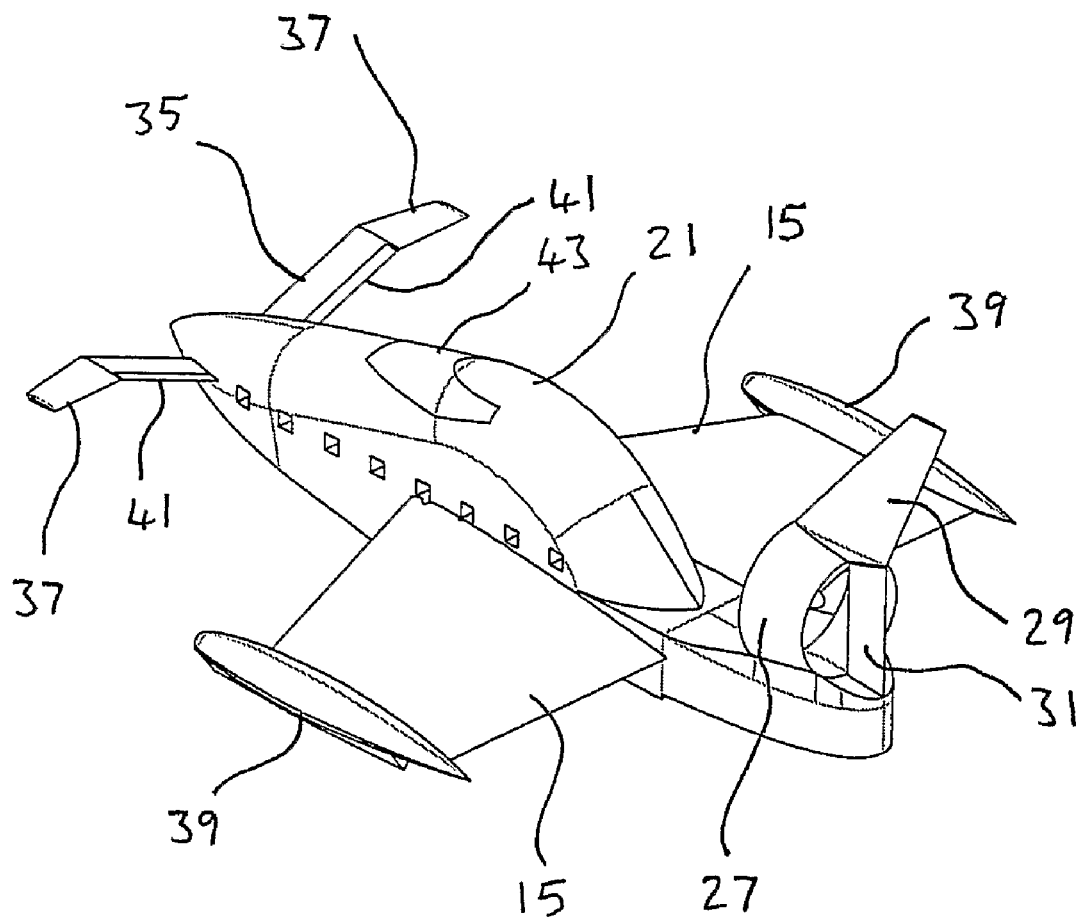
FIG. 8 is an elevation from above and behind of the wing-in-ground-effect craft.

Both embodiments are an amphibious wing-in-ground-effect craft 11. The wing-in-ground-effect craft 11 is characterized by canard configuration, having a loaded canard forewing 13 and a main wing 15 of forward delta configuration attached to fore 17 and mid 19 sections of a body 21 respectively. The body 21 is formed with an integral planing hull 23, and extends rearward to a tail section 25 which incorporates a ducted fan 27, and a vertical stabilizer 29. A rudder 31 is located in the exhaust of the ducted fan 27, for steering the craft 11. The ducted fan 27 has a three bladed impellor 33, which in the first embodiment is belt driven from a turbocharged 1800 cc Subaru EA82 liquid cooled internal combustion engine. With the rudder 31 mounted in the full flow of the duct 27, it is configured to serve as a stator, acting to reduce the induced spiral in the airflow exiting the duct 27. While these embodiments have a five bladed fan, it will be appreciated that the number of blades may be varied, according to preferences. For example, a three bladed fan may prove equally suitable.

The canard forewing 13 has about 12% of the area of the main wing 15, and has inner portions 35 having a dihedral configuration disposed at a first angle of inclination from the vertical of 68° (equating to the inner portion having a dihedral angle of 22°), and outer portions 37 disposed at a second angle of inclination from the vertical of about 91° (equating to an anhedral angle of about 1°).

The inner portions 35 have an angle of attack of 7.5°, while the outer portions 37 have an angle of attack of 4.5°. The main wing 15 is of forward delta configuration and has a flat to slightly anhedral configuration and has an angle of attack of from 4° to 4.5°. The main wing 15 is a wide chord delta wing based on a NACA 2606 foil section, (alternate DHMTU section). The main wing 15 incorporates pontoon floats 39 attached to opposite outer extremities thereof, one pontoon 39 on each side of the craft, on the end of each main wing 15. The pontoon floats 39 provide an endplate for "fence" effect and low speed and static buoyancy.

The canard forewing 13 has control surfaces in the form of elevons 41 attached behind the inner portions 35. The elevons 41 are used to trim the attitude of the craft, and maintain stability in turns.

The benefit of having the canard forewing in the configuration described above is that it avoids the canard forewing flying in ground-effect, and also provides enhanced sea clearance, avoiding the canard forewing getting buried in the occasional sea. This also improves stability and provides an undisturbed airflow to the main wing.

The effect of having the canard tip sections outer portions 37 arranged are horizontal or raked slightly down (anhedral), raises the center of lift relative to the centre of gravity, enhancing both vertical and horizontal stability. This is also significant when the main part of the canard and elevon control surfaces are stalled the airflow around the tip sections is still attached maintaining vertical stability.

With the angle of attack of the inner portions 35 of the canard forewing 13 at approximately 7½ degrees, 3 degrees more than the main wing, the result is that the canard tends to stall first, dropping the nose of the craft 11; an inherent stability benefit of the canard. (The canard tip sections are at 4½ degrees, identical to the main wing).

The higher angle of attack of the canard forewing 13 increases as the nose pitches up due to the effect of the dihedral thus enhancing the canard's "stall first" pitch stability. The dihedral also acts to move the center of lift of the canard closer towards the center of gravity thus enhancing nose up pitch stability.

The surface of the wing 15 is designed to be walked on and the wingtip pontoons 39 provide sufficient buoyancy to support these loads. The craft 11 can be positioned on a typical beach with the wing pontoon 39 at the waters edge and the main hull 23 afloat thus enhancing access where no facilities exist. The wing tip pontoons 39 are also set to be just in contact with the sea surface at rest and lift clear once the main hull 23 is on the step (on the plane).

The wing-in-ground-effect craft has been specifically designed to maximize sea state operability. The hull 23 is of narrow deep "V" stepped configuration, and has a fine entry. The trailing edge of the delta wing is clear of the sea surface at low speeds and particularly on the plane resulting in a lower power requirement to get over the "hump" at takeoff.

The body 21 has a windscreen 43 to afford the pilot a view. The configuration of the body 21 and the ducted fan 27 shields the duct 27 from ingesting solid water or spray which would generally result in blade failure. The inlet of the duct 27 is approximately 130% of the throat/fan swept area resulting in a small and efficient multi blade fan running at high speed (typically 4,500-5,000 RPM) without the tip vortex problem. The pylon for the drive shaft aft bearing support is also configured to direct airflow towards the approaching fan blade.

The first embodiment is made using composite foam fibre sandwich construction, in both the hull and attached structures including the wings. The wings have stubby spar inner construction and have stressed skin outer construction.

The first embodiment is a road transportable, 3 place, powered, ½ scale, proof of concept model, having the following dimensions:

| | | | |
|---|---|---|---|
| Length Over All | | Meter | 8 |
| Wing Width | Extended | Meter | 5 |
| | Folded | Meter | 3.5 |
| Stabilizer Height | | Meter | 3.5 |
| Weight | Dry | kg | 500 |
| | Fuel | Liter | 50 |
| | Crew/passenger(s) | kg | 180 |
| | Miscellaneous | kg | 20 |
| Total Takeoff Weight | | kg | 750 |
| Speed | Takeoff airspeed | Knots | 35 |
| | Cruise airspeed | Knots | 60 |
| | Maximum | Knots | 80 |
| Sea Stats TO&L | | Meter | 0.75 |
| Operational Altitude | Cruise | Meter | 2 |
| | Pop-up | Meter | 10 |
| Power | Subaru EA82 | cc | 1,800 |
| | | RPM | 4,500 |
| | Turbocharged | HP | 85-160 |
| Propulsion | Ducted Fan | | 5 Blade |
| Range | | N/miles | 200 |
| Crew/passengers | | ea | 1 + 1 (+1) |

While the first embodiment has been described as a proof of concept model, it could easily find a niche market in the recreational environment, given its size, road transportability and competitive cost.

The second embodiment is a full sized 16 meter working prototype, capable of landing and takeoff in the open sea in relatively vigorous sea state conditions. The second embodiment incorporates a sophisticated articulated gangway system to enhance personnel transfer, this may be in the form of a demountable, retractable, articulated gangway in the nose of the main hull. It is capable of carrying a 4 Tonne payload (18 passengers, 1.5 Tonne cargo and fuel) at a maximum speed of 130 Knots in a marine environment. Construction can be the same as the first embodiment, although for weight savings it may be preferred to utilise carbon fibre/Kevlar, and/or aluminium.

Propulsion is provided by two light weight high output engines. One provides direct drive to the ducted fan 27, the second drives a Hamilton three stage water jet unit or surface piercing propeller at the stern of the stepped main hull 23.

Wing-in-ground-effect craft are significantly inefficient at take-off due to "hump" drag and require almost 200% of cruise power to overcome this drag. The second embodiment of the wing-in-ground-effect craft overcomes this requirement to a large degree by incorporating the second drive units either driving a conventional propeller through a retractable leg, a surface effect propeller or a Hamilton jet drive. Once clear of the sea surface the wet drive unit is shut down and in the case of the leg or SE propeller the leg is rotated or the SE prop feathered. The wet drive also provides a high degree of low speed manoeuvrability that would not be achievable with the ducted fan. The dual system also provides a degree of redundancy in the event of mechanical failure providing the ability to manoeuvre and get the vessel up on the plane using either drive.

Dimensions of the second embodiment are as follows:

| | | | |
|---|---|---|---|
| Length Over All | | Meter | 16 |
| Width Over All | | Meter | 10 |
| Height Over All | | Meter | 7 |
| Weight | Dry | kg | 2,750 |
| | Fuel | Liter | 500 |
| | Crew (2) | kg | 200 |
| | Passengers (18) | kg | 1,800 |
| | Freight | kg | 1,500 |
| Total Takeoff Weight | | kg | 6,750 |
| Speed | Takeoff | Knots | 43 |
| | Cruise | Knots | 100 |
| | Maximum | Knots | 130 |
| Operational Altitude | Cruise | Meter | 2-5 |
| | Pop-up | Meter | 12 |
| Sea State TO&L | | Meter | 1.5 |
| Power | 2 × Gas Turbines | HP | 300-350 ea |
| | | RPM | 4,500 |
| Propulsion | Ducted Fan | | 5 Blade |
| | Wet drive | | Hamilton |
| Range | | N/miles | 1,000 |

From a safety point of view the wing-in-ground-effect craft offers advantages over helicopters which are major contributors to the risk assessment/profile of airborne marine logistic operations, primarily because it has a lower mechanical fatigue susceptibility.

Although aimed at certification under maritime legislation the wing-in-ground-effect craft of this embodiment could be upgraded to aircraft performance with the ability to fly out of ground effect by the addition of high angle wingtip extensions.

Various other modifications may be necessitated by changes in configuration of the craft. For example it may be necessary to add droop extensions to the outer wing sections to counteract possible tendency to stall at high angles of attack. If vessel instability in ground effect is experienced, it may necessitate the addition of raked wingtip extensions. There may also be a requirement for additional control surfaces, and modification to foil sections.

A quick release mechanism may also be incorporated to facilitate deployment and recovery by crane. Other details that are likely to be required for a commercial craft include development of an offshore facility launch and recovery system, a mooring system, a fire protection system and fire rating certification, and upgrade to aircraft performance capability (by fitting high angle wingtip extensions).

The primary focus of the wing-in-ground-effect craft development is the provision of a fast "hot shot" logistic support tool to the offshore oil and gas development and tourism industries. Other applications could include emergency response (rapid deployment of personnel & resources), emergency evacuation (platforms, offshore facilities, commercial shipping & remote communities), search and rescue at sea, oil spill recovery (deployment of containment/cleanup materials, personnel & equipment), Coastguard/coastal surveillance and Customs and Immigration, environmental monitoring and research, survey, fisheries, and defense forces and military applications. Upgrade into aircraft performance capability would bring with it the potential for further application expansion.

It should be appreciated that the scope of the invention is not limited to the specific embodiments disclosed herein.

The claims defining the invention are as follows:

1. A wing-in-ground-effect craft characterized by canard configuration, comprising a canard forewing and a main wing, wherein the canard forewing comprises an inner portion with a dihedral configuration and an outer portion, the inner port ion being disposed at a first angle of inclination from a vertical axis, the outer portion being disposed at a second angle of inclination from the vertical axis which is greater in absolute terms than the first angle, and the outer portion having an angle of attack less than an angle of attack of the inner portion.

2. A wing-in-ground-effect craft as claimed in claim 1 wherein the canard forewing has from about 10% to about 40% of the area of the main wing.

3. A wing-in-ground-effect craft as claimed in claim 1 wherein said first angle lies from 80° to 65°.

4. A wing-in-ground-effect craft as claimed in claim 1 wherein said second angle is from 85° to 95°.

5. A wing-in-ground-effect craft as claimed in claim 1 wherein said dihedral configuration has an angle of attack of from 5° to 9°.

6. A wing-in-ground-effect craft as claimed in claim 1 wherein said outer portion has an angle of attack of from 2° to 6°.

7. A wing-in-ground-effect craft as claimed in claim 1 wherein said outer portion has an angle of attack of from 4° to 4.5°.

8. A wing-in-ground-effect craft as claimed in claim 1 wherein said canard forewing incorporates control surfaces.

9. A wing-in-ground-effect craft as claimed in claim 1 wherein said main wing is of forward delta configuration.

10. A wing-in-ground-effect craft as claimed in claim 1 wherein said main wing has an angle of attack of from 2° to 6°.

11. A wing-in-ground-effect craft as claimed in claim 1 wherein said main wing has an angle of attack of from 4° to 4.5°.

12. A wing-in-ground-effect craft as claimed in claim 1 wherein said wing-in-ground-effect craft is amphibious, and has a planing hull.

13. A wing-in-ground-effect craft as claimed in claim 12 wherein said main wing incorporates pontoon floats attached to opposite outer extremities thereof.

14. A wing-in-ground-effect craft as claimed in claim 12 wherein said wing-in-ground-effect craft is adapted for low speed control when the wing-in-ground-effect craft is afloat.

15. A wing-in-ground-effect craft as claimed in claim 12 wherein said wing-in-ground-effect craft is adapted for water propulsion when the wing-in-ground-effect craft is afloat.

16. A wing-in-ground-effect craft as claimed in claim 1 wherein said wing-in-ground-effect craft has a single vertical stabilizer located at a rear of said wing-in-ground-effect craft.

17. A wing-in-ground-effect craft as claimed in claim 16 wherein said vertical stabilizer is located atop a first propulsion unit in the form of a ducted fan.

18. A wing-in-ground-effect craft as claimed in claim 17 wherein said wing-in-ground-effect craft includes at least one rudder control surface located in a flow pathway of said ducted fan.

* * * * *